United States Patent [19]

Nakajima et al.

[11] Patent Number: 4,591,623
[45] Date of Patent: May 27, 1986

[54] THERMOSETTING RESIN COMPOSITION

[75] Inventors: Hiroyuki Nakajima, Suita; Fumiyuki Miyamoto, Itami; Masakazu Murayama, Takatsuki; Seiji Oka, Amagasaki; Eiki Jidai, Toyonaka, all of Japan

[73] Assignee: Mitsubishi Denki Kabushiki Kaisha, Tokyo, Japan

[21] Appl. No.: 743,896

[22] Filed: Jun. 12, 1985

[30] Foreign Application Priority Data

Jun. 15, 1984 [JP] Japan .................. 59-124137

[51] Int. Cl.$^4$ ............................. C08L 63/02
[52] U.S. Cl. ................................. 525/524
[58] Field of Search ........................ 525/524

[56] References Cited

U.S. PATENT DOCUMENTS

| 750,975 | 1/1967 | Foster | 400/88 |
|---|---|---|---|
| 3,873,637 | 3/1975 | Fujiwara et al. | 525/524 |
| 4,060,656 | 11/1977 | Naka et al. | 428/355 |
| 4,212,960 | 7/1980 | Hayashi et al. | 525/524 |
| 4,309,473 | 1/1982 | Minamisawa et al. | 525/524 X |
| 4,374,963 | 2/1983 | Morgan et al. | 525/524 X |

*Primary Examiner*—Earl Nielsen
*Attorney, Agent, or Firm*—Oblon, Fisher, Spivak, McClelland & Maier

[57] ABSTRACT

A thermosetting resin composition, which is characterized by mixing 5 to 300 parts by weight of tri-functional vinyl monomer and 0.1 to 10 parts by weight of phenoxy resin with respect to 100 parts by weight in total of an epoxy compound containing in its molecule at least two epoxy groups and a curing agent for said epoxy compound.

3 Claims, No Drawings

THERMOSETTING RESIN COMPOSITION

This invention relates to a novel thermosetting resin composition. More particularly, it is concerned with a thermosetting resin composition prepared by mixing a tri-functional vinyl monomer and phenoxy resin with an epoxy compound having at least two epoxy groups, the resin composition being capable of giving a cured substance having a low viscosity and a long pot life, and being excellent in its mechanical and electrical properties.

There have so far been made numerous patent applications for inventions concerning epoxy type impregnating resin compositions, as the result of which various kinds of epoxy type impregnating resin compositions have been used for manufacture for actual machinery and tools.

However, most of these epoxy type impregnating resin compositions are of high viscosity at a room temperature and of a short pot life. For the purpose of lowering the viscosity, addition of a diluent is a generally adopted method; however, many of ordinary diluents are highly irritating to skin and are also liable to remarkable lowering of the mechanicl and electrical properties of the cured substance, hence the current situation is such that no satisfactory properties can be obtained for the cured substance with such diluents.

In view of the actual situation as mentioned above, the present inventors conducted strenuously their studies and researches for obtaining an improved thermosetting resin composition free from the above-mentioned various disadvantages, as the result of which they completed the present invention.

It is therefore a primary object of the present invention to provide a thermosetting resin composition which is capable of giving a cured substance having a low viscosity and a long pot life, and being excellent in its mechanicl and electrical characteristics.

According to the present invention in general aspect of it, there is provided a thermosetting resin composition which is characterized by mixing 5 to 300 parts by weight of a tri-functional vinyl monomer and 0.1 to 10 parts by weight of phenoxy resin with respect to 100 parts by weight in total of an epoxy compound containing at least two epoxy groups in its molecule and a curing agent for said epoxy compound.

The foregoing object, other objects as well as specific ingredients for use in this thermosetting resin composition and the method for its manufacture will become more apparent and understandable from the following detailed description thereof with several preferred examples thereof.

The characteristic feature of the present invention resides in that a tri-functional vinyl monomer is mixed with an epoxy compound having therein at least two epoxy groups to thereby increase its cross-linking density and improve its heat stability, and that, at the same time, by uniformly distributing with good compatibility the network of the epoxy type cured substance and the network of the vinyl type cross-linked polymeric substance, both of which are not reactive each other, the advantage of the epoxy type compound such as flexibility, dimensional stability, and so on and the advantage of the vinyl type cross-linked polymeric substance such as its high heat deformation temperature, etc. may stand together, thereby obtaining the cured substance of well-balanced properties. The characteristic feature of the present invention resides further in that, by inclusion into the resin composition of the phenoxy resin having a high molecular weight, as a non-cross-linkable rectilinear component, as as to disperse the same in the cross-linked network, the cured substance is imparted with flexibility, and the resin composition is able to have improved adhesive property.

As the epoxy compound to be used for the purpose of the present invention, any kind of epoxy compound having in its molecule at least two epoxy groups may be appropriate. Examples of such epoxy compounds are: bisphenol type epoxy compounds such as "DER-332" (a trademark for a product of Dow Chemical Co.), "EPICOTE 828" (a trademark for a product of Shell Chemical Co.), "GY-255" (a trademark for a product of Ciba-Geigy Co.), and so on; novolac type epoxy compounds such as "DEN-4231" (a trademark for a product of Dow Chemical Co.), and so on; and alicyclic type epoxy compounds such as "GY-179" (a trademark for a product of Ciba-Geigy Co.), and so on. The epoxy compounds may be used in single form or in mixture.

As the epoxy curing agent to be used for the present invention, there may be enumerated cyclic acid anhydrides such as methyl tetrahydrophthalic anhydride ("HN-2200" (a product of Hitachi Kasei Kogyo K.K., Japan) etc.), methyl hexahydrophthalic anhydride ("HN-5500" (a product of Hitachi Kasei Kogyo K.K., Japan) etc.), methyl and methylene tetrahydrophthalic anhydride ("METHYLHYMIC ANHYDRIDE" (a product of Hitachi Kasei Kogyo K.K., Japan) etc.), and so forth; metal salts and metal chelates such as tricresyl borate, triethanolamine titanate, cobalt acetylacetonate, zinc octylate, tin octylate, and so forth; and Lewis acids and amine complex thereof such as $BF_3$, $BCl_3$, $PF_3$, $AsF_5$, etc. These curing agents may be used in mixture, depending on necessity.

As the tri-functional vinyl monomer to be used for the present invention, there may be enumerated, for example: triallyl trimellitate, triallyl isocyanurate, trimethylolpropane tri(meth)acrylate, trihydroxyethyl isocyanurate tri(meth)acrylate, and so forth.

According to the present invention, such curing agent is usually used at a rate of from 50 to 150 parts by weight with respect to 100 parts by weight of epoxy compound containing in its molecule at least two epoxy groups.

The tri-functional vinyl monomer is mixed in a range of from 5 to 300 parts by weight with respect to 100 parts by weight in total of the epoxy compound containing in its molecule at least two epoxy groups and the curing agent for such epoxy compound. When the tri-functional vinyl monomer is at a rate below 5 parts bay weight, no effect of its addition (lowered viscosity, etc.) can be obtained. On the contrary, when the rate exceeds 300 parts by weight, the shrinkage factor due to curing of the epoxy compounds becomes excessively large.

The phenoxy resin to be used for the present invention should preferably have its molecular weight in a range of from 15000 to 60000. The phenoxy resin is mixed at a rate of from 0.1 to 10 parts by weight with respect to 100 parts by weight in total of the above-mentioned epoxy compound and curing agent. When the mixing rate is below 0.1 part by weight, the flexibility imparting effect cannot be sufficiently obtained, and, when its mixing quantity exceeds 10 parts by weight, the viscosity of the resin composition becomes too high, which is not preferable from the practical standpoint.

For the purpose of accelerating the reaction, a catalyst may be added to the resin composition of the present invention. Also, for the purpose of lowering viscosity, there may be added a vinyl monomer containing in its molecule two or less number of vinyl group.

As the catalyst, there may be exemplified various vinyl polymerization initiating catalysts such as dicumyl peroxide, benzoyl peroxide, di-t-butyl hydroperoxide, azo-bis-isobutyronitrile, and others.

Examples of the vinyl monomer containing in its molecule two or less number of vinyl group are: styrene, vinyl toluene, α-methylstyrene, acrylonitrile, N-vinylpyrrolidone, bisphenol-A, diglycidylether di(-meth)acrylate, and so forth. While such vinyl monomer may be added at a rate not exceeding 200 parts by weight with respect to 100 parts by weight of the above-mentioned thermosetting resin composition, it should preferably be kept to the minimum necessity in order not to invite lowering in the mechanical and electrical properties of the thermosetting resin composition. When the quantity of the vinyl monomer containing in its molecule one vinyl group exceeds 200 parts by weight, the heat stability of the resulting cured substance becomes unfavorably lowered.

The thermosetting resin composition of the present invention to be obtained in the above-described manner is not only of low viscosity and excellent in its impregnating property, but also results in a cured substance which is excellent in its electrical and mechanical characteristics.

With a view to enabling those persons skilled in the art to practise the present invention in a proper manner, the following preferred examples of the thermosetting resin composition will be presented.

EXAMPLE 1

A thermosetting resin composition (impregnating resin composition) was prepared by adding 65 parts by weight of HN-2200, 20 parts by weight of trimethylolpropane triacrylate, 0.2 part by weight of phenoxy resin having a moleular weight of about 30000, 0.05 part by weight of dicumyl peroxide as the catalyst, and 0.2 part by weight of zinc octylate to 80 parts by weight of "EPICOTE 828".

The thus obtained impregnating resin composition had its initial viscosity at 25° C. of 100 cp.

The pot life of the resulted impregnating resin composition was measured in the following manner: the resin composition was left as it was in an air-conditioned vessel having a constant temperature of 25° C. and a relative humidity of 35%, and its viscosity was measured periodically for the number of days until the resin composition came to have its viscosity of 400 cp. at 25° C., which was made the pot life thereof. From this measurement, the impregnataing resin composition was found to have its pot life of six months or longer.

Subsequently, the resin composition was poured into a vessel having an inner capacity of 3 mm×200 mm×200 mm, in which it was subjected to curing first at a temperature of 110° C. for six hours, and then at a temperature of 150° C. for 16 hours, thereby obtaining a cured substance.

The resulted cured substance had its favorable properties of bending strength which was 12 kg/mm$^2$ at 25° C., weight decrease after 16 days of continued heating at 200° C. which was 2.0%, and dielectric dissipating factor which was 1% or less at 100° C. Further, the skin irritating test was conducted, which revealed that no change whatsoever took place on the part of the skin as tested.

The following are the standards, on which the above-mentioned tests were based.

Bending strength: JIS C-2103
Weight decrease due to heating: JIS C-2103
Dielectric dissipating factor: JIS C-2103
Skin irritating test: Back hair of a rabbit was clipped, and the specimen resin composition was applied onto it (for one or three times), after which changes on the hair were observed.

EXAMPLE 2

A thermosetting resin composition (impregnating resin composition) was prepared by adding 86 parts by weight of HN-5500, 30 parts by weight of trihydroxyethyl isocyanurate triacrylate, 0.3 part by weight of phenoxy resin having a molecular weight of approximately 30000, and 10 parts by weight of styrene to 100 parts by weight of "GY-255", to which 0.2 part by weight of benzoyl peroxide as the catalyst and 0.5 part by weight of cobalt acetylacetonate were further added.

The thus obtained impregnating resin composition had its initial viscosity of 80 cp. at 25° C.

When the pot life of the impregnating resin composition was measured in the same manner as described in Example 1 above, it was found to be six months or longer (the number of days until the resin composition reached its viscosity of 400 cp.).

Subsequently, the resin composition was poured into a vessel having an inner volume of 3 mm×200 mm×200 mm, in which it was subjected to curing first at a temperature of 130° C. for six hours, and then at a temperature of 160° C. for 16 hours, thereby obtaining a cured substance.

When the thus obtained cured substance was measured for its properties in the same manner as in Example 1 above, favorable results were obtained such that its bending strength was 12 kg/mm$^2$ at 25° C., its weight decrease after 16 days of continued heating at 200° C. was 1.0%, and its dielectric dissipating factor was 1% or less at 100° C.

EXAMPLE 3

A thermosetting resin composition was prepared by adding 2.0 parts by weight of phenoxy resin having a molecular weight of approximately 30000, 92 parts by weight of "METHYLHYMIC ANHYDRIDE" (a tradename for a product of Hitachi Kasei Kogyo K.K., Japan), 10 parts by weight of trimethylolpropane triacrylate, 10 parts by weight of trihydroxyethyl isocyanurate trimethacrylate, 0.2 part by weight of di-t-butylhydroperoxide as the catalyst, and 0.3 part by weight of tin octylate to 100 parts by weight of "GY-255".

The thus obtained resin composition had its initial viscosity of 100 cp. at 25° C., and its pot life as measured in in accordance with the method same as that in Example 1 above, it was six months or longer.

Subsequently, the resin composition was poured into a vessel having an inner capacity of 3 mm×200 mm×200 mm, in which it was subjected to curing first at a temperature of 120° C. for six hours, and then at a temperature of 160° C. for 16 hours, thereby obtaining a cured substance.

The properties of the resulted cured substance were measured in the same mannner as in Example 1 above, which showed favorable values such that the bending strength was 11.5 kg/mm² at 25° C., the weight decrease after 16 days of continued heating at 200° C. was 2.0%, and the dielectric dissipating factor was 1% at 100° C.

EXAMPLE 4

A thermosetting resin composition was prepared by adding 0.2 parts by weight of phenoxy resin having a molecular weight of about 30000, 40 parts by weight of trihydroxyethyl isocyanurate triacrylate, 10 parts by weight of styrene, and 85 parts by weight of HN-2200 to 100 parts by weight of "DER-332" and 10 parts by weight of "EPICOTE 1004" (a tradename for a product of Shell Chemical Co.), to which 0.1 part by weight of dicumyl peroxide and 0.2 part by weight of zinc octylate were further added.

The thus obtained resin composition indicated its initial viscosity of 120 cp. at 25° C.

When the pot life of the resulted resin composition was measured in the same manner as in Example 1 above, it was found to be six months or longer.

Subsequently, the resin composition was poured into a vessel having an inner capacity of 3 mm×200 mm×200 mm, in which it was subjected to curing first at a temperature of 120° C. for ten hours, and then at a temperature of 160° C. for 16 hours, thereby obtaining a cured substance.

When the resulted cured substance was measured for its characteristics in the same manner as in Example 1 above, favorable results were obtained such that the bending strength was 11.5 kg/mm² at 25° C., the weight decrease after 16 days of continued heating at 200° C. was 2.0%, and the dielectric dissipating factor was 1% or below at 100° C.

EXAMPLE 5

A thermosetting resin composition was prepared by adding 0.3 part by weight of phenoxy resin having a molecular weight of approximately 30000, 30 parts by weight of trihydroxyethyl isocyanurate triacrylate, 150 parts by weight of styrene, and 100 parts by weight of HN-2200, 0.2 part by weight of di-t-butyl hydroperoxide as the catalyst, and 0.3 part by weight of zinc octylate to 100 parts by weight of "DER-332" and 50 parts by weight of "EPICOTE 1004".

The thus obtained resin composition indicated its initial viscosity of 50 cp. at 25° C.

When the pot life of the resulted resin composition was measured in the same manner as in Example 1 above, it was found to be six months or longer.

Subsequently, the resin composition was poured into a vessel having an inner capacity of 3 mm×200 mm×200 mm, in which it was subjected to curing first at a temperature of 120° C. for ten hours, and then at a temperature of 160° C. for 16 hours, thereby obtaining a cured substance.

The resulted cured substance was measured for its characteristics in the same manner as in Example 1 above, upon which favorable results were obtained such that the bending strength was 9.0 kg/mm² at 25° C., the weight decrease after 16 days of continued heating at 200° C. was 4.0%, and the dielectric dissipating factor was 2% at 100° C.

EXAMPLE 6

A resin composition was prepared by adding 0.5 part by weight of phenoxy resin having a molecular weight of approximately 30000, 100 parts by weight of trihydroxyethyl isocyanurate triacrylate, 50 parts by weight of styrene, and 100 parts by weight of HN-2200 (a product of Hitachi Kasei Kogyo K.K., Japan), to 100 parts by weight of "DER 332" (an epoxy compound manufactured by Dow Chemical Co.), to which 0.2 part by weight of di-t-butyl hydroperoxide as the catalyst and 0.2 part by weight of zinc octylate were further added.

The thus obtained resin indicated its initial viscosity of 100 cp. at 25° C.

The pot life of the resin measured in the same manner as in Example 1 above showed that it was six months or longer.

Subsequently, the resulted resin was cured first at a temperature of 120° C. for ten hours, and then at a temperature of 160° C. for 16 hours, thereby obtaining a cured substance.

The resulted cured substance was measured for its characteristics in the same manner as in Example 1 above, upon which favorable results were obtained such that the bending strength was 11.0 kg/mm² at 25° C., the weight decrease after 16 days of continued heating at 200° C. was 4.0%, and the dielectric dissipating factor was 1.5% at 100° C. (The standards of measurement for these properties were based on JIS C-2103.)

EXAMPLE 7

A resin composition was prepared by adding 1.0 part by weight of phenoxy resin having a molecular weight of about 30000, 200 parts by weight of trihydroxyethyl isocyanurate triacrylate, 50 parts by weight of styrene, 90 parts by weight of methyl and methylene tetrahydrophthalic anhydride, and 30 parts by weight of polyphenylmethylene polymaleimide to 100 parts by weight of "GY-255" (an epoxy compound manufactured by Ciba-Geigy Co.), to which 0.1 part by weight of dicumylperoxide as the catalyst was further added.

The thus obtained resin composition indicated its initial viscosity of 150 cp. at 25° C.

The pot life of the resulted resin composition as measured in accordance with the method used in Example 1 above showed that it was six months or longer.

Subsequently, the resulted resin composition was subjected to curing first at a temperature of 130° C. for ten hours, and then at a temperature of 160° C. for 16 hours, thereby obtaining a cured substance. The resulted cured substance indicated its bending stregth of 11.0 kg/mm² at 25° C., the weight decrease after 16 days of continued heating at 200° C. of 1.5%, and the dielectric dissipating factor of 1.0% at 100° C. (The standards of measurement for these properties were based on JIS C-2103.)

As described in the foregoing, the thermosetting resin composition according to the present invention possesses various favorable properties such that it has a low viscosity and a long pot life, and is less skin-irritating; moreover, shaped articles obtained from the resin composition has a large bending strength, a small dielectric dissipating factor, small weight decrease due to heating, and so forth. As the consequence of this, the thermosetting resin composition according to the present invention can be suitably employed as the impregnating resin composition for large-sized rotary machines, induction motors, and so on.

So far the present invention has been described in detail with reference to several preferred examples thereof. However, it should be understood that these examples are illustrative only and not so restrictive, and that any changes and modifications may be made by those skilled persons in the art without departing from the spirit and scope of the invention as recited in the appended claims.

We claim:

1. A thermosetting resin composition, which is characterized by mixing 5 to 300 parts by weight of tri-functional vinyl monomer and 0.1 to 10 parts by weight of phenoxy resin with respect to 100 parts by weight in total of an epoxy compound containing in its molecule at least two epoxy groups and a curing agent for said epoxy compound.

2. A thermosetting resin composition according to claim 1, characterized in that a vinyl monomer containing at most two vinyl groups in one molecule thereof is mixed at a rate not exceeding 200 parts by weight relative to 100 parts by weight of said thermosetting resin composition.

3. A thermosetting resin composition according to claim 1, wherein said phenoxy resin has a molecular weight in a range of from 15000 to 60000.

* * * * *